(12) United States Patent
Le Chevalier

(10) Patent No.: US 12,125,405 B2
(45) Date of Patent: Oct. 22, 2024

(54) METHODS AND SYSTEMS FOR AUTOMATIC SPEECH SIGNAL PROCESSING USING NATURAL LANGUAGE PROCESSING (NLP) ALGORITHMS TO PROVIDE PERSONALIZED LEARNING ACTIVITIES DURING REAL-TIME SPOKEN CONVERSATIONS

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 112 days.

(21) Appl. No.: 17/712,021

(22) Filed: Apr. 1, 2022

(65) Prior Publication Data

US 2023/0316940 A1 Oct. 5, 2023

(51) Int. Cl.
| | |
|---|---|
| G09B 5/00 | (2006.01) |
| G06F 40/35 | (2020.01) |
| G06F 40/58 | (2020.01) |
| G09B 7/00 | (2006.01) |
| G10L 15/00 | (2013.01) |
| G10L 15/18 | (2013.01) |
| G10L 15/22 | (2006.01) |
| G10L 15/30 | (2013.01) |

(52) U.S. Cl.
CPC .............. *G09B 5/00* (2013.01); *G06F 40/35* (2020.01); *G06F 40/58* (2020.01); *G10L 15/005* (2013.01); *G10L 15/1815* (2013.01); *G10L 15/22* (2013.01); *G09B 7/00* (2013.01); *G10L 15/30* (2013.01)

(58) Field of Classification Search
CPC ........... G09B 5/00; G06F 40/35; G06F 40/58; G10L 15/005; G10L 15/1815; G10L 15/22

See application file for complete search history.

(56) References Cited

U.S. PATENT DOCUMENTS

| | | | | |
|---|---|---|---|---|
| 6,665,640 B1 * | 12/2003 | Bennett | ..................... | G09B 5/04 |
| | | | | 704/E15.04 |
| 7,376,556 B2 * | 5/2008 | Bennett | ..................... | G09B 5/04 |
| | | | | 704/E15.047 |
| 7,392,185 B2 * | 6/2008 | Bennett | ............... | G06F 16/3329 |
| | | | | 704/E15.047 |

(Continued)

*Primary Examiner* — Xuan M Thai
*Assistant Examiner* — Sadaruz Zaman
(74) *Attorney, Agent, or Firm* — Morgan, Lewis & Bockius LLP; Manita Rawat

(57) ABSTRACT

In some embodiments, a method includes receiving, at a processor, audio data related to a verbal conversation between a first user and a second user and converting, using a natural language processing algorithm, the audio data into a set of text data portions. The method further includes analyzing the set of text data portions to determine a domain of the verbal conversation and a set of concepts associated with the domain and retrieving a set of educational content files associated with the set of concepts to provide educational content related to and during the verbal conversation to the first user or the second user. The method includes sending at least one notification to cause at least one pause of the verbal conversation and automatically sending, during the at least one pause of the verbal conversation, a signal to playback at least one educational content file.

24 Claims, 4 Drawing Sheets

(56) References Cited

U.S. PATENT DOCUMENTS

| | | | | |
|---|---|---|---|---|
| 10,043,133 | B2* | 8/2018 | McFall | G09B 7/02 |
| 10,642,848 | B2* | 5/2020 | Oros | H04W 4/18 |
| 10,789,316 | B2* | 9/2020 | Noble | G06F 16/438 |
| 11,151,891 | B2* | 10/2021 | Le Chevalier | G09B 5/12 |
| 11,538,205 | B2* | 12/2022 | Le Chevalier | G06T 11/00 |
| 11,626,025 | B1* | 4/2023 | Le Chevalier | G09B 5/00 |
| 2011/0119075 | A1* | 5/2011 | Dhoble | G16H 10/60 |
| | | | | 705/2 |
| 2011/0177483 | A1* | 7/2011 | Needham | G09B 7/00 |
| | | | | 434/322 |
| 2022/0208016 | A1* | 6/2022 | Le Chevalier | H04L 12/1827 |
| 2023/0012269 | A1* | 1/2023 | Young | G10L 15/22 |

\* cited by examiner

METHODS AND SYSTEMS FOR AUTOMATIC SPEECH SIGNAL PROCESSING USING NATURAL LANGUAGE PROCESSING (NLP) ALGORITHMS TO PROVIDE PERSONALIZED LEARNING ACTIVITIES DURING REAL-TIME SPOKEN CONVERSATIONS

TECHNICAL FIELD

Some embodiments described herein relate to speech signal processing for speech recognition, correlation, and identification of patterns and domains. In particular, but not by way of limitation, some embodiments described herein relate to automatic speech signal processing using natural language processing algorithms to provide personalized learning activities during real-time spoken conversations.

BACKGROUND

Some known voice-assisted electronic devices are activated when a certain keyword is spoken and detected. The voice-assisted electronic devices may then output media data, such as audio or video, in response to a command made by an individual after the certain keyword is spoken and detected. The use of such a keyword and command is unnatural and can lack context within the context of a verbal conversation between two or more people. A need exists for a method and a system to automatically deconstruct real-time spoken conversations, using automatic speech signal processing and natural language processing algorithms, into contextual domains and concepts to provide personalized learning activities.

SUMMARY

In some embodiments, a method includes receiving, at a processor, audio data related to a verbal conversation between a first user and a second user. The method includes converting, at the processor and using a natural language processing algorithm, the audio data into a set of text data portions. Each text data portion from the set of text data portions is associated with a timestamp from a plurality of timestamps and at least one of the first user and the second user. The method further includes analyzing, at the processor, the set of text data portions to determine a domain of the verbal conversation and a set of concepts associated with the domain. The method includes retrieving, at the processor, a set of educational content files associated with the set of concepts to provide educational content related to and during the verbal conversation to the first user or the second user. The method includes sending, from the processor and based on the set of timestamps and a set of properties of each educational content file from the set of educational content files, at least one notification to cause at least one pause of the verbal conversation. The method includes automatically sending, during the at least one pause of the verbal conversation, a signal to playback at least one educational content file from a playlist of the set of educational content files to facilitate education to the first user or the second user related to the domain.

DETAILED DESCRIPTION

During conversations between two or more individuals, or two or more groups of individuals, the topics (or languages) of the conversations may be more familiar to one individual than another individual in some instances. The individual who is less familiar with the topics or languages of the conversations may find it challenging to follow the conversations because the terms and expressions cannot be understood or comprehended fully, leading to misunderstanding and miscommunication.

For example, conversations between an expert(s) in a field and a non-expert(s) in the field (e.g., an educator and a student, a professional loan provider and a loan seeker, a professional mechanic and a car owner, an architect and a home buyer, a homebuilder and a home buyer, a human resource professional and a job seeker, a healthcare provider and a patient) can be challenging for the non-expert(s) to follow and the non-expert(s) would benefit in having a better understanding of the various concepts presented during or after the conversations. As another example, conversations between a first speaker (or a group of speakers) who is not as fluent in a spoken language as a second speaker (or group of speakers) can also be challenging, especially for the less fluent person/group.

Embodiments described herein include methods and systems to automatically analyze a verbal (or spoken) conversation, pre-recorded or received substantially in real-time, and determine a contextual domain and concepts of the conversation and provide educational learning content and/or activities to help the conversation participants (and/or other listeners) with understanding the topic(s) of the conversation. The educational learning content and/or activities can be provided, streamed, downloaded, or accessed through a variety of digital and/or non-digital media (e.g., multimedia audio, video, radio FM/AM broadcast, physical multimedia DVD, written content, and/or others.) In addition, the methods and systems described herein can provide personalized learning content by factoring in the user's profile, preferences, and educational objects pre-stored in the server or determined on-the-fly as the conversation takes place. The personalization feature can structure the learning of a new concept into several distinct steps, including, for example, a full description of the new concept, followed by a set of examples relating to the new concept, and ending with at least one quiz.

Embodiments described herein include methods and systems to automatically detect languages spoken during the verbal conversation and facilitate the translations of the languages of the users.

Figure 1:
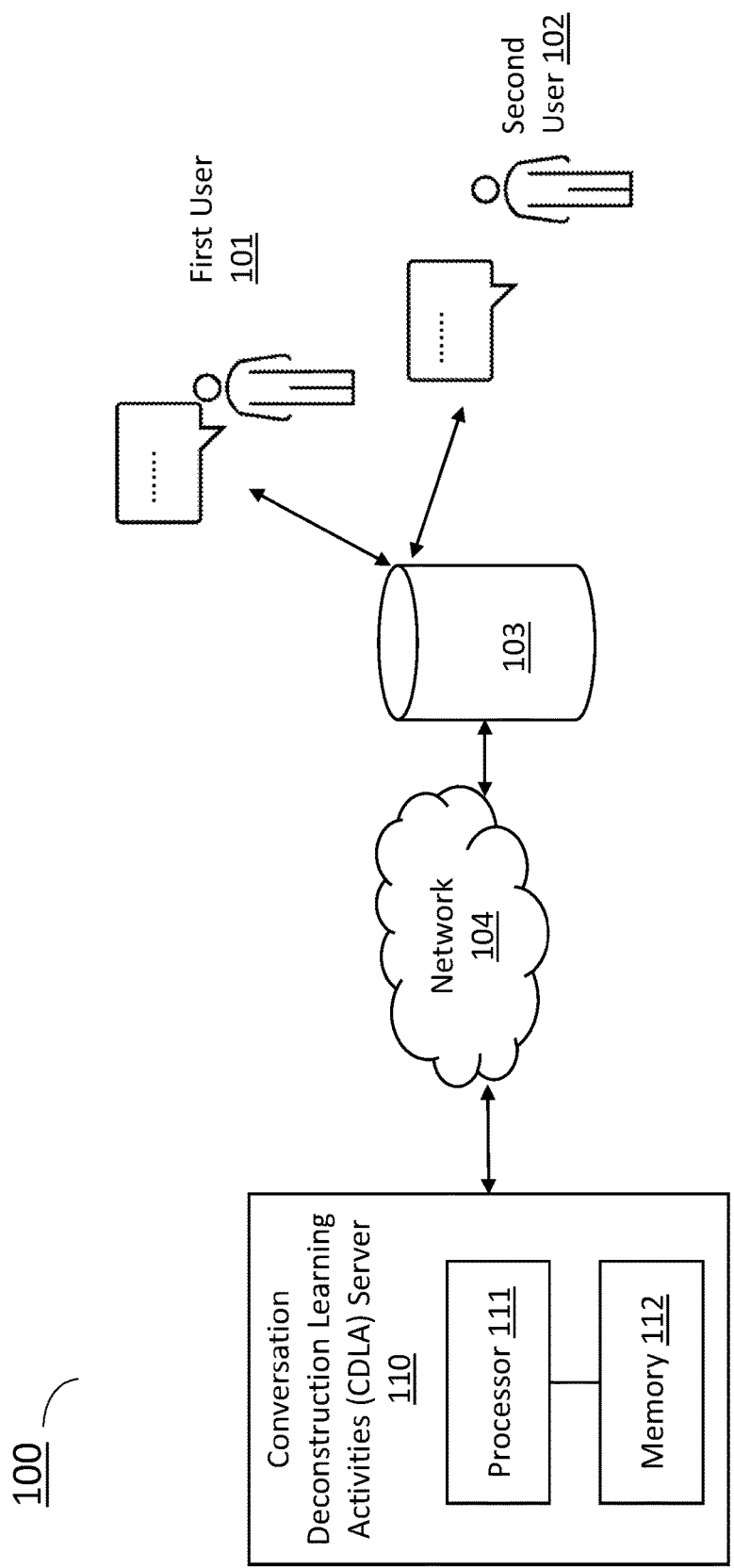
FIG. 1 is an example schematic diagram illustrating a conversation deconstruction learning activities (CDLA) system, according to some embodiments.

FIG. 1 is an example illustrative diagram illustrating a conversation deconstruction learning activities (CDLA) system 100, according to some embodiments. In some embodiments, a first user 101 and a second user 102 (or more than two users) may be having a conversation (verbal/spoken) in an environment where a voice-assisted electronic device 103 is located. The conversation may relate to any topics or domains and in some implementations does not need to include a specific activation word to activate the voice-assisted electronic device 103. In some implementations, the first user 101 may speak an activation word (e.g., a specific word(s) (e.g., Alexa, or Google), an inquiry, an instruction, a phrase, a command, or a non-verbal sound) to activate the voice-assisted electronic device 103. When the voice-assisted electronic device 103 detects the activation word using one or more audio input components/devices (e.g., one or more microphones and/or transducers), the voice-assisted electronic device 103 may capture the audio data and/or the video data of the verbal conversation (pre-recorded or received substantially in real-time as the conversation takes place) and send a file (including the audio and/or the video data) to the CDLA server 110 via a network 104. In some implementations, the voice-assisted compute device 103 is a stand-alone compute device having one or more audio input components/devices. In some implementations, the voice-assisted compute device 103 can be a user device having one or more audio input components/devices (e.g., a mobile device, a tablet personal computer, a personal computing device, a desktop computer, a laptop computer, an electronic reader, a video or audio system integrated with a vehicle) in communication with the CDLA server 110.

The CDLA server 110 can be a compute device (or multiple compute devices) having at least one processor 111 and at least one memory 112 operatively coupled to the at least one processor 111. In some instances, the CDLA server 110 can be any combination of a hardware-based module(s) (e.g., a field-programmable gate array (FPGA), an application specific integrated circuit (ASIC), a digital signal processor (DSP), a graphics processing unit (GPU)) and/or a software-based module(s) (computer code stored in memory 112 and/or executed at the processor 111) capable of performing one or more specific functions associated with that module. In some instances, the CDLA server 110 can be a server such as, for example, a web server, an application server, a proxy server, a telnet server, a file transfer protocol (FTP) server, a mail server, a list server, a collaboration server and/or the like. In some instances, the CDLA server 110 can be a personal computing device such as a desktop computer, a laptop computer, a personal digital assistant (PDA), a smart mobile telephone, a tablet personal computer (PC), and/or so forth. In some implementations, the CDLA server 110 can perform one or more specific functions through a cloud computing platform implemented at the CDLA server 110. The details of the CDLA server 110 are further described with regards to FIG. 2.

In some implementations, the CDLA server 100 can be configured to provide the user interface capabilities (e.g., an online educational platform, a CDLA application) that allows the user device (an electronic device (e.g., a mobile phone) that the user uses (not shown in FIG. 1); or the voice-assisted electronic device 103 in FIG. 1) to access the educational content (also referred to as learning activities or learning content) including, for example, but not limited to, accessing by reading, listening to, and watching contents of eTextbooks, academic material, reference articles, courses, training, large number of questions & answers, tests, accredited testing, as well as tutoring, reskilling, and upskilling services. The user interface capabilities can also allow the user device to enter, update, and manage the user profiles and preferences (e.g., 211 in FIG. 2) to personalize the learning experience of the user.

In some implementations, the CDLA server 110 can be configured to provide the conversation deconstruction learning activities via a remote cloud computing server(s) (not shown). For example, the CDLA server 110 can be configured to store instructions of the conversation deconstruction learning activities in the memory 112 and execute those activities by the processor 111. The CDLA server 110 can communicate with a remote cloud computing server(s) (not shown) to perform analysis using the computational resources residing on the remote cloud computing server(s). The results of computation can be sent to the CDLA server 110 and presented to the user interface installed on the user device.

Figure 2:
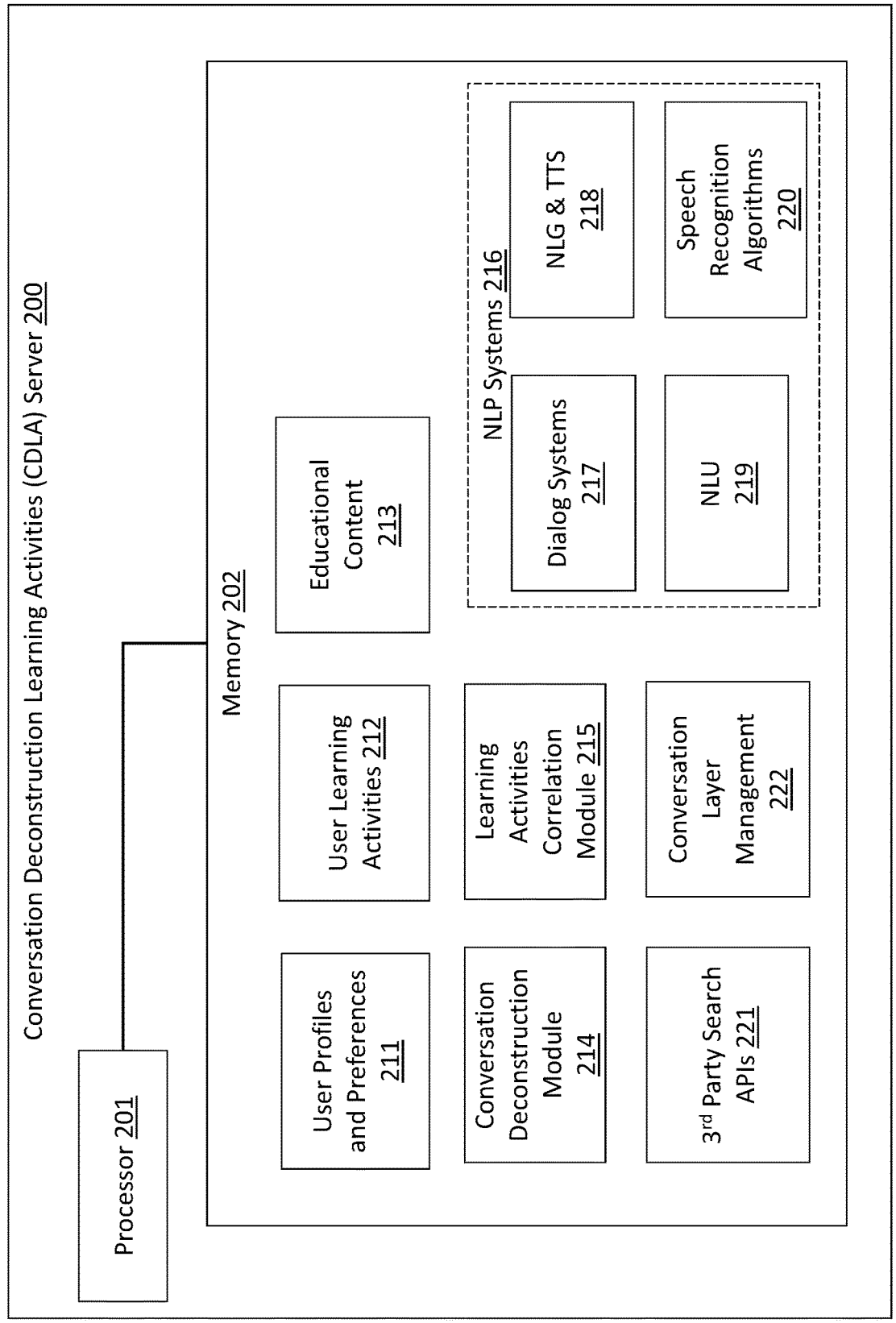
FIG. 2 is an example schematic diagram illustrating a CDLA server, according to some embodiments.

FIG. 2 is an example schematic diagram illustrating a conversation deconstruction learning activities (CDLA) server, according to some embodiments. The CDLA server 200 is functionally and physically similar to the CDLA server 110 described with regards to FIG. 1. In some embodiments, the CDLA server 200 includes a processor 201 and a memory 202 operatively coupled with the processor 201.

The processor 201 can be configured to, for example, write data into and read data from the memory 202, and execute the instructions stored within the memory 202. The processor 201 can also be configured to execute and/or control, for example, the operations of other components of the CDLA server 200 (such as a network interface card, other peripheral processing components (not shown)). In some implementations, based on the instructions stored within the memory 202, the processor 201 can be configured to execute one or more steps of the conversation deconstruction learning activities process(es) as described with regards to FIG. 3, discussed below.

The memory 202 can be, for example, a random-access memory (RAM) (e.g., a dynamic RAM, a static RAM), a flash memory, a removable memory, a hard drive, a database and/or so forth. In some implementations, the memory 202 can include (or store), for example, a database, process, application, virtual machine, and/or other software modules (stored and/or executing in hardware) and/or hardware modules configured to execute a conversation deconstruction learning activities (CDLA) process(es) as described with regards to FIG. 3. In such implementations, instructions for executing the CDLA process(es) and/or the associated methods can be stored within the memory 202 and executed at the processor 201.

In some implementations, the memory 202 can store user profiles and preferences 211, user learning activities 212, educational content 213, software code representing instructions to be executed by a processor (e.g., processor 201) and cause the processor to execute the conversation deconstruction module 214, the learning activities correlation module 215, the third party search APIs 221, and the conversation layer management module 222, and the Natural Language Processing (NLP) systems 216. In some implementations, these modules or software program modules 214-222 can include computer-executable instructions executable by one or more computers or other devices. Generally, software program modules include routines, programs, objects, components, data structures, and/or etc. that perform particular tasks or implement particular abstract data types. Typically, the functionality of the software program modules can be combined or distributed as desired in various embodiments.

User profiles and preferences 211 can include, for example, profile information input by the user and/or a learning profile of the user generated by the CDLA server 200. In some implementations, the user can provide the contextual domains or concepts within the contextual domain that the user is interested in as part of the profile information via a user interface of a user's device. The CDLA server 200 can save these contextual domains or concepts in the user profiles and preferences 211. In some implementations, the CDLA server 200 can generate an on-going learning profile of the user (and accessible to the user via a user interface (e.g., a web browser, a mobile application) on a user's device) based on the audio/video data of the conversations that the user had in the past. For example, the user can access the CDLA application (e.g., an application stored in the memory of a user's electronic device and executed by the processor of the user's electronic device; the CDLA application can be in communication with the CDLA server 200) on the user's electronic device to input/enter a contextual domain (e.g., Home Financing or Car Insurance) to be the learning preference and such input can be stored in the user profiles and preferences 211. For another example, the user's past conversations (e.g., audio data stored in the memory 202) indicate that the user is interested in learning about the Alzheimer's disease. The contextual domain (e.g., medical) and the concept (e.g., Alzheimer's disease) within the contextual domain can be stored in the user profiles and preferences 211. The CDLA server 200 can update the learning profile of the user at users profiles and preferences 211 automatically, periodically, and/or received substantially in real-time as the user's conversation data are received by the CDLA server 200 and/or as the user accesses learning contents and activities (stored in educational content 213) via the user interface. The CDLA server 200 can provide on-going recommendations of learning content and activities (stored in educational content 213) based on the learning profile of the user at users profiles and preferences 211 using machine learning and analytics algorithms. In some implementations, the user profiles and preferences 211 can store a type of educational content preferred by a user. For example, the educational content 213 (also referred to as learning content and activities) can be categorized into, for example, three types to help the users/learners master the concept: passive learning (educational content including, e.g., concept description), active learning (educational content including, e.g., examples associated with a concept), and recall learning (educational content including, e.g., quiz to recall and reinforce concepts learnt). The user profiles and preferences 211 can also include profile information of the user (e.g., name, age, education level, school affiliation, study of majors, study of minors, and/or the like.)

User learning activities 212 can be included in the user profiles and preferences 211 in some implementations, and can include the user's past conversations, analysis of the user's past conversations, and/or user's past learning content and activities. For example, the audio/video data of the user's past conversation with a medical professional can be stored in the user learning activities 212. The CDLA server 200 may have deconstructed the past conversation (according to the CDLA process as discussed with regards to FIG. 3) and determined that the user is interested in the contextual domain (e.g., medical) and the concept(s) (e.g., Alzheimer's disease) within the contextual domain. The CDLA server 200 may store the deconstruction and the analysis of the conversation in the user learning activities 212. Moreover, the CDLA server 200 may have provided to the user the beginner level education (e.g., a difficulty level of the learning content) of the learning content and activities related the concepts (e.g., Alzheimer's deserver) based on the analysis of the conversation. The CDLA server 200 may store the identities of the learning content and activities that have been provided to the user in the user learning activities 212. The CDLA server 200 may, based on the stored user learning activities, provide the next learning content and activities to the user (e.g., the intermediate level education of the learning content and activities).

The educational content 213 (or learning content and activities) can include, for example, educational content in a variety of subject matter, topics, contextual domains, concepts, and formats (e.g., images, audio, video, text, braille books for the visually impaired users, plain text, HTML, JSON, XML, and/or the like.) For example, the educational content 213 can be content relating to textbooks, courses, jobs, and videos. The educational content 213 can be deconstructed into a set of educational content files in a library of concepts, which can be accessed on-demand and consumed by degrees of proximity and/or complexity based on the user profiles and preferences 211. In some implementations, the CDLA server 200 can provide, recommend, or structure a playlist of educational content files based on the verbal conversation of a user. An example of such a structure of the playlist can include a description phase of the concept (e.g., passive learning), followed by examples of the concept (e.g., active learning), and concluding by a quiz with multiple questions/answers relating to the concept (e.g., recall learning). Other combinations of activities can be added or combined to form many different structures of playlists.

In some implementations, the educational content 213 can include multiple content databases, such as domain-specific concepts, Passive Active Recall (PAR) content, recorded conversations, academic content, domain-specific content, third party content, and/or the like. The educational content 213 can be categorized into, for example, three types to help the users/learners master the concept: passive content, active content, and recall content. The passive content can include content to be read, watched, or listened to by a learner (or a user), such as pages of a textbook, playback of an audio or video file with the description of the educational content. In some implementations, the passive content can be non-interactive content that is read/spoken to the user by the CDLA server 200 (e.g., the NLP systems 216 of the CDLA server 200). The active content can include content enabling interactions with the learner, such as question & answers, quizzes and interactive tutorials, and/or the like. The recall content can include content used for testing the knowledge of the learner, such as the standardized test (e.g., SAT), the driver's license knowledge test, mastering the knowledge of Excel, or the intelligence quotient (IQ) tests.

A method of processing content in the educational content 213 of the CDLA server 200 including parsing the content in the educational content 213 and assigning contextual domains and/or concepts to content items using a learned model is described in a related U.S. Patent Publication No. 2019/0385470, filed Jun. 19, 2018 titled "Time-Constrained Personalized Learning Activities in Online Education Platforms," the contents of which are incorporated herein in its entirety.

The memory 202 can store software code representing instructions of the natural language processing (NLP) systems 216. The NLP systems 216 can be configured to process and analyze natural language data using components including the dialog systems 217, the Natural Language Generation (NLG) and the Test-to-Speech (TTS) systems 218, the Natural Language Understanding (NLU) system 219, and the speech recognition algorithms 220.

In some implementations, the processor 201 can execute the software code representing instructions of the speech recognition algorithms 220 to recognize or convert spoken conversations (e.g., the audio data of the spoken conversation) into text. The speech recognition algorithms 220 can include, for example, Hidden Markov model, Viterbi algorithm or others to disambiguate parts-of-speech by, for example, determining transition probabilities and emission probabilities. The emission probability can be defined as the probability of observing an observable given an internal state. The transition probability can be defined as the probability of transiting from one internal state to another internal state. In some implementations, the processor 201 can execute the software code representing instructions of the speech recognition algorithms 220 to use sequence tagging to extract the main parts of speech in a language such as nouns, verbs, adjectives, prepositions, pronouns, adverbs, conjunctions, and interjections.

In some implementations, the processor 201 can execute the software code representing instructions of the NLU system 219 to analyze machine reading comprehension in the fields of, for example, question answering, text categorization, voice-activation, archiving and large-scale content analysis. The NLU system 219 can include a lexicon of the languages (e.g., Wordnet), and a sematic parser with grammar rules to break sentences into an internal representation and guide the comprehension when converting natural language texts into formal meaning representations.

In some implementations, the processor 201 can execute the software code representing instructions of the dialog systems 217 to use a set of templates to determine what type of answers is best suited for a question or command initiated by the user. The dialog systems 217, when executed, can be configured to determine a specific answer to a spoken question initiated by the user.

In some implementations, the dialog systems 217 can be activated without being triggered by a question or a command from the user. As discussed below and with regards to the CDLA process in FIG. 3, the CDLA server 200 can receive and deconstruct the audio data of the spoken conversation and determine a set of educational content files (from the educational content database 213) that are relevant to the contextual domain and concepts of the spoken conversation to provide learning content and activities the user. During this process, the dialog systems 217 can send a notification to cause a pause of the spoken conversation such that one or more education content file can be shared with the user. In some instances, the dialog systems 217 can send a notification to prompt a question to the user about what next steps that the user wants to take with the shared educational content file.

For example, when a spoken conversation takes place in real time or a pre-recorded spoken conversation is played to the user, the CDLA server 200 can send a notification through an audio output component of an electronic device (e.g., the voice-assisted electronic device 103 in FIG. 1) which can cause a pause of the conversation (or the playback of the conversation). The audio output component can then play a notification to announce the presence of one or more educational content files available to the user, prompting that user to either select one of these educational content files for further learning content and activities through the dialog systems 217, ignore the notification such that the spoken conversation can continue, and/or instruct the CDLA server 200 to resume the conversation. In some implementations, for a conversation using electronic devices over a network (e.g., Zoom), the conversation can be paused (e.g., in response to a command from the user) and the educational content files can be played.

In some implementations, the processor 201 can execute the software code representing instructions of the NLG & TTS systems 218 to generate text and speech that a human can understand based on, e.g., textual data input. In some implementations, the NLG & TTS systems 218, when executed, can be configured to use artificial intelligence (AI) programming to produce written or spoken narratives from a data set that is easy for humans to understand.

In some implementations, the memory 202 can store software code representing instructions of the conversation deconstruction module 214. The conversation deconstruction module 214, when executed by the processor 201, can receive the textual data generated by the NLP systems 216 and determine, using a machine learning model, a contextual domain of the spoken conversation and a set of concepts associated with the contextual domain. In some implementations, the machine learning model can be trained using, e.g., an ensemble method (e.g., a linear support vector classification, logistic regression, k-nearest neighbor, naïve Bayes, or stochastic gradient descent,) to obtain better predictive performance of the determination of the contextual domains and the concepts. For example, for a spoken conversation, the CDLA server 200 can assign the contextual domain of biology and the following concepts: macromolecules, cells, energy, cellular respiration, and photosynthesis. In some implementations, the contextual domain (of the spoken conversation or the educational content files) can be associated with areas (or topics) of the subject matter or content included in the spoken conversation or the educational content files. In some implementations, the contextual domain and the concepts generated by the CDLA server 200 can be hierarchical in nature, and the hierarchy can be used when assigning the contextual domain/concepts to a particular content item. For example, if CDLA server 200 assigns a child concept to a textual data file, the corresponding parent concept is automatically assigned. In some implementations, the contextual domain can be a concept in a higher hierarchical level compared to a set of concepts in a lower hierarchical level than the contextual domain. The contextual domain or the concept(s) of the spoken conversation can indicate a content category of the spoken conversation. The spoken conversation (or the textual data file(s) associated with at least a portion of the spoken conversation) can include a file of concept metadata, which includes information of the concepts assigned to the spoken conversation (or the textual data file(s)) and the hierarchical structure of the concepts.

In some implementations, the conversation deconstruction module 214 can generate concept pairs, where concepts in a concept pair are related to each other. In some implementations, the conversation deconstruction module 214 can identify associations between concepts based on a determination that two concepts frequently appear in proximity to one another in content items (e.g., the spoken conversation or the educational content) are likely to be related. As a result, the conversation deconstruction module 214 can identify associations between concepts appearing in proximity to one another in content items of the educational content database 213 (e.g., concepts appearing on the same page or concepts appearing in the same section of two documents), and/or the textual data of the spoken conversation generated by the NLP systems 216 (e.g., concepts appearing in the same conversation within a pre-determine period of time, concepts appearing in different conversations having at least one speaker in common). In some implementations, the conversation deconstruction module 214 can apply, for example, an a priori algorithm to identify concepts appearing in proximity to one another across multiple content items. Other algorithms identifying associations between concepts in the documents may alternatively be used.

In some implementations, for concepts assigned to a particular educational content file or a textual data file of the spoken conversation, the conversation deconstruction module 214 can also generate an indicator of a relative strength (also referred to as a relevancy level) of association between the concepts and the particular educational content file or the textual data file of the spoken conversation. For example, for a first concept that is very strongly associated with the particular document, the conversation deconstruction module 214 may assign, say, a relevancy level of 0.99, while for a second concept that is only mildly associated with the particular content item, the conversation deconstruction module 214 may assign a relevancy level of 0.4.

In some implementations, the conversation deconstruction module 214 can determine the indicators of relative strength (e.g., scores of 0.0 to 1.0) using one or more interestingness measures, such as support, confidence, lift, and conviction. The support $supp(x)$ for a concept x is given by the probability $P(x)$ of the concept occurring in a given document. The confidence $conf(x \rightarrow y)$ for a concept y occurring in a document given the occurrence of concept x in the document is defined by the conditional probability of y given x, or $P(x \text{ and } y)/P(x)$. The lift $lift(x \rightarrow y)$ for a concept y occurring in a document given the occurrence of concept x is given by the observed support for x and y in the document as a ratio of the expected support if x and y were independent concepts, or $P(x \text{ and } y)/[P(x)P(y)]$. The conviction $conv(x \rightarrow y)$ is given by a ratio of the expected frequency of concept x occurring in a document without concept y (assuming x and y are independent concepts) to the observed frequency of x without y, or $P(x)P(\text{not } y)/P(x \text{ and not } y)$.

A method of processing content including parsing the content in the educational content 213 and assigning contextual domains and/or concepts to content items using a learned model is described in a related U.S. Patent Publication No. 2019/0385470, filed Jun. 19, 2018 titled "Time-Constrained Personalized Learning Activities in Online Education Platforms," the contents of which are incorporated herein in its entirety. The same method can be applied to the textual data generated by the NLP systems 216 based on the spoken conversation to assign contextual domains and/or concepts to the textual data of the spoken conversation.

In some implementations, the memory 202 can store software code representing instructions of the learning activities correlation module 215. The learning activities correlation module 215, when executed, can identify associations between the concepts assigned to the spoken conversation (by the conversation deconstruction module 214) and/or between the concepts assigned to the educational content files stored in the educational content database 213. In some implementations, the CDLA server 200 may determine and retrieve the set of educational content files based on a set of characteristics of the set of text data portions of the spoken conversation and a set of characteristics of the educational content files. The set of characteristics of the text data portions of the spoken conversation can include the determined domain and concepts. The set of characteristics of each educational content file can include, for example, the domain of the content, the concepts of the content associated with the domain, the format (e.g., audio, video, text-only), the total of number of words, the length of the time used to playback the educational file, the content category (passive content, active content, or recall content), the complexity level of the content included in the educational content file, other metadata for classification, searching, marker, and/or the like. In some implementations, the learning activities correlation module 215, when executed, can be configured to correlate between the domain and concepts of the set of text data portions of the verbal conversation and the domain and concepts of each educational content files. In some instances, the CDLA server 200 may retrieve the educational content files when the correlation reaches a pre-determined criteria. For example, the conversation deconstruction module 214, when executed, can assign, to a verbal conversation, a domain of Biology and a plurality of concepts including macromolecules, cells, energy, cellular respiration, and photosynthesis. The metadata (or the set of characteristics) associated with a set of educational content files include Biology as the domain and the macromolecules, cells, tissues, collagens as the concepts. The correlation between the domain and concepts of the set of verbal conversation and the set of educational content files can be determined, using a pre-defined algorithm, to be 70%, which exceeds the pre-determined criteria of, e.g., 65%. As a result, the set of educational content files can be provided to the user.

In some implementations, the memory 202 can store software code representing instructions of the conversation layer management 222. The conversation layer management 222, when executed by the processor 201, can manage the aggregation of the text-based educational content (determined based on the contextual domain and concept correlation between the spoken conversation and the educational content) into separate conversation layers. In some implementations, the dialog systems 217 can query during a spoken conversation and send to the text-to-speech component of the NLG & TTS systems 218 to convert from textual data to speech data. Details of the conversation layer management 222 are discussed below with regards to FIG. 3.

In some implementations, the memory 202 can store software code representing instructions of third-party search application programming interfaces (APIs) 221. Educational content files can, in some instances, be stored in a repository located outside of the CDLA server 200. Thus, the CDLA server 200 can make a request via the $3^{rd}$ party APIs 221 to search and retrieve educational content files that are relevant to the contextual domains and concepts determined based on the spoken conversation.

Figure 3:
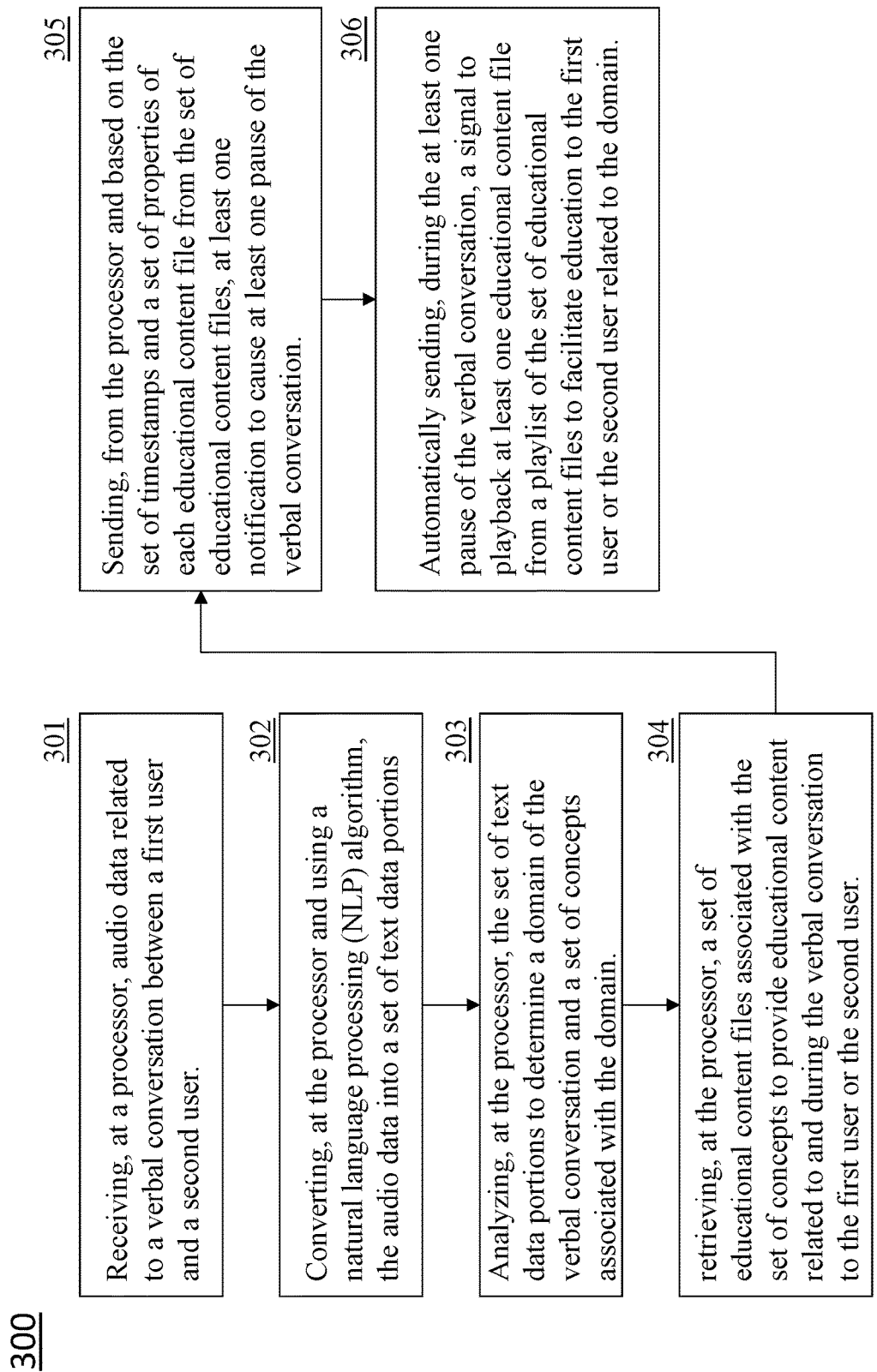
FIG. 3 illustrates a flow chart of an example CDLA process, according to some embodiments.

FIG. 3 illustrates a flow chart of an example conversation deconstruction learning activities (CDLA) process 300, according to some embodiments. This CDLA process 300 can be implemented at a processor and/or a memory of a CDLA system (e.g., processor 111 or memory 112 at the CDLA server 110 as discussed with respect to FIG. 1, and/or the processor 201 or memory 202 at the CDLA server 200 discussed with respect to FIG. 2).

At 301, the example CDLA process 300 includes receiving, at a processor, audio data related to a verbal conversation between a first user and a second user. The verbal conversation can be among more than two users, or two (or more) groups of users. The data related to the verbal (or spoken) conversation can be pre-recorded or received substantially in real-time as the verbal conversation takes place between a first user and a second user (in some implementations, the verbal conversation is between more than two users). The data related to the verbal conversation received substantially in real-time can include data related to the verbal conversation received within a pre-determined range of time (e.g., within one minute) after the end of the verbal conversation. In some implementations, the CDLA server can continuously and repeatedly receive audio data of the verbal conversation through an audio input component located in (or operatively coupled to) the CDLA server or an electronic device (e.g., a user device, or a voice-assisted electronic device 103 in FIG. 1).

At 302, the example CDLA process 300 includes converting, at the processor and using a natural language processing (NLP) algorithm, the audio data into a set of text data portions. Each text data portion from the set of text data portions can be associated with a timestamp from a set of timestamps (e.g., what time the words or sentences were spoken) and at least one of the first user and the second user (e.g., which user spoke the words or sentences of the conversation). In some implementations, the processor of the CDLA server can execute the software code representing instructions of the NLP systems (216 in FIG. 2) including, for example, the NLU system 219 and the speech recognition algorithms 220, to convert the audio data into a set of text data portions. In some implementations, each text data portion can correspond to the speech made by the first user before the second user speaks. The CDLA server can map each text data portion to a specific user in the conversation. In some implementations, each text data portion can correspond to the speeches made by both the first user and the second user during a pre-determine period of time.

At 303, the example CDLA process 300 includes analyzing, at the processor, the set of text data portions to determine a domain of the verbal conversation and a set of concepts associated with the domain. In some implementations, the processor can receive the set of text data portions generated by the NLP systems 216 and determine, using a machine learning model, a contextual domain of the verbal conversation and a set of concepts associated with the contextual domain. In some implementations, concepts generated by the CDLA server can be hierarchical in nature, and the hierarchy can be utilized when assigning concepts to a particular content item. For example, if CDLA server assigns a child concept to a textual data file, the corresponding parent concept is automatically assigned. In some implementations, the contextual domain can be a concept in a higher hierarchical level compared to a set of concepts in a lower hierarchical level than the contextual domain. The contextual domain or the concept(s) of the spoken conversation can indicate a content category of the spoken conversation. The spoken conversation (or the textual data file(s) associated with at least a portion of the spoken conversation) can include a file of concept metadata that includes information of the concepts assigned to the spoken conversation (or the textual data file(s)) and the hierarchical structure of the concepts. In some implementations, the CDLA server can determine a set of concepts (or a playlist of concepts) with each concept associated with a text data portion at a different timestamp. The CDLA server can generate a marker for each concept of the set of concepts such that educational content files retrieved based on that concept can be played at that marker when the conversation comes to a pause.

In some implementations, the example CDLA process 300 can determine, at the processor during the verbal conversation and for each concept from the set of concepts, a relevancy level (or an indicator of a relative strength) of that concept and from a set of relevancy levels. In some implementations, the CDLA server can determine the relevancy level of a concept at least based on the domain and a time period between that concept and a next different concept from the set of concepts. Each relevancy level from the set of relevancy levels indicates a correspondence between that concept and the verbal conversation (or a text data portion from the set of text data portions). For example, for the same text data portion of the spoken conversation, the CDLA server may assign Concept 1, Concept 2, and Concept 3 that are relevant to the content of the spoken conversation. The CDLA server may also determine the relevancy level of Concept 1 is 90%, the relevancy level of Concept 2 is 85%, and the relevancy level of Concept 3 is 30%. The example CDLA process 300 can include ranking, at the processor, the set of concepts based on the set of relevancy levels. In some implementations, the example CDLA process 300 can include selecting, at the processor, a subset of concepts (e.g., concepts having a relevancy level exceeding a pre-determined threshold) from the set of concepts based on the ranking and retrieving, at the processor, the set of educational content files associated with the subset of concepts.

In some implementations, the CDLA server can generate concept pairs, where concepts in a concept pair are related to each other. In some implementations, the CDLA server can identify associations between concepts based on a determination that two concepts frequently appear in proximity to one another in content items (e.g., the spoken conversation or the educational content) are likely to be related. As a result, the CDLA server can identify associations between concepts appearing in proximity to one another in content items of the set of text data portions (e.g., concepts appearing in the same conversation within a pre-determine period of time, concepts appearing in different conversations having at least one speaker in common). In some implementations, the CDLA server can apply, for example, an a priori algorithm to identify concepts appearing in proximity to one another across multiple text data portions (or spoken conversations).

At 304, the example CDLA process 300 includes retrieving, at the processor, a set of educational content files associated with the set of concepts to provide educational content related to and during the verbal conversation to the first user or the second user. In some implementations, each educational content file from the educational content database (e.g., 213 in FIG. 2) can have a set of characteristics (also referred to as a set of properties), which can include, for example, the domain of the content, the concepts of the content associated with the domain, the format (e.g., audio, video, text-only), the total of number of words, the length of the time used to playback the educational file, the content category (passive content, active content, or recall content), the complexity level of the content included in the educational content file, and/or the like.

In some implementations, the CDLA server may determine and retrieve the set of educational content files based on the determined contextual domain and the concepts of the set of text data portions and the set of characteristics of the educational content files. For example, in some instances, the CDLA server may retrieve the set of education content files based on a correlation between the domain and concepts of the set of text data portions of the verbal conversation and the domain and concepts of each educational content files. In some instances, the CDLA server may retrieve the educational content files when the correlation reaches a pre-determined criteria. For example, the conversation deconstruction module 214, when executed, can assign, to a verbal conversation, a domain of Biology and a plurality of concepts including macromolecules, cells, energy, cellular respiration, and photosynthesis. The metadata (or the set of characteristics) associated with a set of educational content files include Biology as the domain and the macromolecules, cells, tissues, collagens as the concepts. The correlation between the domain and concepts of the set of verbal conversation and the set of educational content files can be determined, using a pre-defined algorithm, to be 70%, which exceeds the pre-determined criteria of, e.g., 65%. As a result, the set of educational content files can be provided to the user.

In some instances, in addition to the correlation between the domains and the concepts, the CDLA server may retrieve the educational content files that are under a certain time limit based on the length of the time user to playback the educational file. In some instances, the CDLA server may retrieve the set of educational content files that includes at least one of a passive content type, an active content type, or a recall content type. In some instances, the CDLA server may retrieve the set of educational content files based on the user profile and preference (stored in 211 in FIG. 2) (or a learning profile of the first user) to provide personalized educational content.

In some implementations, the CDLA server can, at a first time, determine a domain of the verbal conversation based on step 303 of the example CDLA process 300. The CDLA server can, at a second time after the first time, retrieve educational content files from the educational content database (e.g., 213 in FIG. 2) based on the domain of the text data portion of verbal conversation and determine if a domain-specific concept is being spoken in the conversation by, for example, comparing the concept definitions and examples associated with the educational content files with the text data portion of the verbal conversation.

In some implementations, the CDLA server can generate a timestamp from a set of timestamps for each educational content file from the set of educational content files and a marker from a set of markers into the spoken conversation stream associated with that timestamp.

At 305, the example CDLA process 300 includes sending, from the processor and based on the set of timestamps and a set of properties of each educational content file from the set of educational content files, at least one notification to cause at least one pause of the verbal conversation or a notification to inform the first user that the playlist of the set of educational content files is available. In some implementations, the example CDLA process 300 includes mapping, into the spoken conversation stream, each educational content file based on the timestamps of the text data portion of the spoken conversation and the markers of the educational content file. In some implementations, the CDLA server can aggregate all conversation layers into a single conversation content record (discussed further below with regards to FIG. 4).

At 306, the example CDLA process 300 includes automatically sending, during the at least one pause of the verbal conversation, a signal to playback at least one educational content file from a playlist of the set of educational content files to facilitate education to the first user or the second user related to the domain. In some implementations, the example CDLA process 300 includes sending, from the processor, a notification to resume the verbal conversation when the playback of the at least one educational content file ends.

Figure 4:
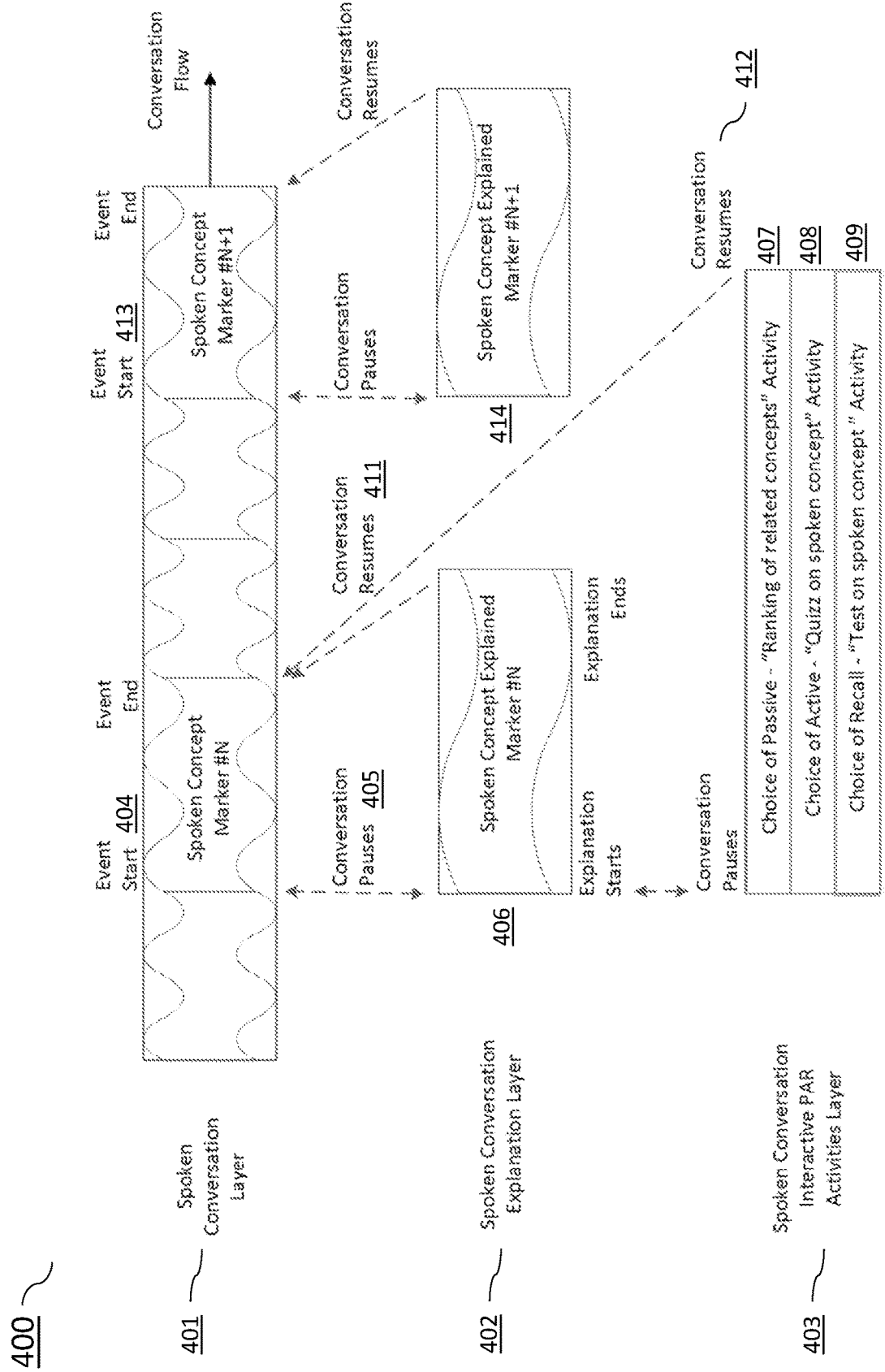
FIG. 4 shows an example use case of the CDLA process, according to some embodiments.

FIG. 4 shows an example use case of the CDLA process 400, according to some embodiments. The CDLA process 400 described in connection with FIG. 4 can be performed, for example, using the systems described above in connection with FIGS. 1 and 2. In some implementations, the CDLA server can continuously and/or repeatedly (e.g., data being received with a sampling rate relatively high to capture the data) monitor the spoken conversation (or the spoken conversation layer 401) and convert, using the NLP systems, the spoken conversation to text data portions until reaching a marker (e.g., marker 404 indicates the Event Start) indicating the presence of a concept (or an educational content file(s) relevant to the concept). In some implementations, the CDLA server can send a notification (e.g., a beeping sound, or an announcement) to the users to cause the pause of the verbal conversation 405 and/or indicate that an educational content file(s) is available for the users. In some implementations, the CDLA server can output, using, for example, the text-to-speech (TTS) systems, the educational content file(s) by, for example, reading/playing back the passive content of the educational content file to explain an concept 406 (via the spoken conversation explanation layer 402). During or after the explanation of the concept, the CDLA server can receive a user input to request more information form the CDLA server to provide a listing of additional correlated learning content and activities that the users can engage with.

For example, the spoken conversation interactive PAR activities layer 403 can provide to the users choices of passive content 407, active content 408, and recall content 409. In some implementations, at any point during this engagement, the users may terminate the interaction (or wait till the educational content file finishes), which instructs the CDLA server to un-pause the spoken conversation to resume the conversation 410 and 411 until the next marker 413 is reached or the user issues a new command/query to the CDLA server. In some implementations, the spoken conversation explanation layer 402 is constructed as a series of explanation of individual concepts (406 and 414), as identified by their marker (404 and 413) in reference to the spoken conversation layer 401. Upon reaching a marker, the spoken conversation pauses and resumes automatically at the end of the explanation output by the CDLA server. The spoken conversation interactive PAR activities layer 403 can be personalized, selected and managed by the user to output additional content activities based on each individual concept. In some implementations, the CDLA server can determine a set of concepts (or a playlist of concepts) with each concept associated with a text data portion at a different timestamp of the verbal conversation. The CDLA server can generate a marker for each concept of the set of concepts such that educational content files retrieved based on that concept can be played at that marker when the conversation comes to a pause. In some implementations, the presentations, descriptions, selections, questions & answers and/or other commands can be voice driven between the CDLA server and the user, providing a display/computer free experience. Alternatively, the CDLA server can provide user interface capabilities (with or without the voice driven features) to an electronic device of the user to provide a combined interactive visualization of each conversation layer and associated content, as shown in the example in FIG. 4.

In some implementations, each educational content file includes a set of characteristics (or properties) that can be stored as metadata associated with that educational content file. The set of characteristics of each educational content file can include, for example, the domain of the content, the concepts of the content associated with the domain, the format (e.g., audio, video, text-only), the total of number of words, the length of the time used to playback the educational file, the content category (passive content, active content, or recall content), the complexity level of the content included in the educational content file, other metadata for classification, searching, marker, and/or the like.

For example, the concept "derivative" associated with the spoken conversation explanation layer 402 can include a definition (and expressed as a sequence of words and sentences in text data and processed by the Text-to-Speech engine as speech data) of: "In mathematics, the derivative of a function of a real variable measures the sensitivity to change of the function value (output value) with respect to a change in its argument (input value). Derivatives are a fundamental tool of calculus. For example, the derivative of the position of a moving object with respect to time is the object's velocity: this measures how quickly the position of the object changes when time advances." The set of properties of this concept can include "mathematics" and "calculus" as classification, "derivative of a function" and "velocity" as keywords, "Marker T1 in spoken conversation" as marker, and "430 characters, 71 words, 3 sentences" for playback running data, among other data. In some implementations, similar methods can be applied to build the other conversation layers (e.g., spoken conversation interactive PAR activities layer 403, which include an active content layer and a recall content layer) to form at least one of the concept explanation layer 402 and the interactive activity-based layer 403. Each of the content layers can be associated with their respective sets of concepts and educational content files.

As another example, take a conversation between two users, where user A is a language tutor (say, tutoring the English language), and user B is a language learner who is learning the English language. The domain here would be English language learning. The CDLA server can continuously and/or repeatedly analyze the spoken conversation between user A and user B to determine the presence of a first concept, that of a simile. Based on user B's stored user profile and preferences, his user learning activities and educational content etc., the CDLA server can determine that user A needs help with the concept of simile. For example, user B may not have either learned about similes, or may have had trouble with similes before. In some embodiments, the CDLA server can send a notification (e.g., a sound or a message etc.) to the users to cause the pause of the verbal conversation so that user B may be presented with educational content file(s) related to similes. In certain situations, pausing the verbal conversation may not be desirable, such as when, user B is paying an hourly rate for the conversation with user A. As such, in addition or in the alternative, the CDLA server can send a notification (e.g., a sound or a message etc.) to just user B notifying him that educational content file(s) related to similes have been found and can be accessed by user B after the verbal conversation with user B has ended.

Returning to FIG. 3, in some implementations, the example CDLA process 300 includes repeatedly monitoring the verbal conversation and determined, at the processor, the updated domain and the concepts of the verbal conversation as the verbal conversation flows. Based on the updated domain and the concepts of the verbal conversation, the example CDLA process 300 can automatically update the playlist of the set of educational content files without any specific user inputs to change the playlist or the domain/concepts. For example, the example CDLA process includes repeatedly monitoring, at the processor, the verbal conversation and continuously converting, at the processor, the verbal conversation into ongoing text data. As the verbal conversation changes content, the example CDLA process 300 can update, based on the ongoing text data, the domain of the verbal conversation or the set of concepts associated with the domain to generate an updated domain or an updated set of concepts associated with the updated domain. The example CDLA process 300 can update the playlist based on the updated domain or the updated plurality of concepts to automatically play a second set of educational content files relevant to the verbal conversation.

In some implementations, the CDLA server can receive, from the first user or the second user during the verbal conversation, an input indicating to change the domain or the concept(s) to an updated domain or updated concepts. The CDLA server can then update the playlist based on the updated domain to automatically play a second set of educational content files relevant to the verbal conversation.

In some implementations, the example CDLA process includes automatically (without user input specific to language translation) detecting languages spoken during the verbal conversation and facilitating the translations of the languages of the users. For example, the example CDLA process includes automatically determining, during the verbal conversation and using artificial intelligence algorithms (e.g., using convolutional and recurrent neural networks, and based on supervised learning, unsupervised learning, or reinforcement learning), a first language (or a first native language) of the first user and a second language (or a second native language) of the second user. In some instances, even when the conversation is spoken in the same language, the language may not be the native language to the first user, or the first user may have other challenges in speaking the language. The artificial intelligence algorithms can be trained to detect different pronunciations of certain words or different uses of grammar of the conversation to predict the speaking languages and/or native languages of the users. Once the CDLA server detects that there is a gap between the languages spoken by the users and/or the native languages of the users, the CDLA server can retrieve the set of educational content files relates to translation of ongoing conversation between the first language spoken by the first user and the second language spoken by the second user.

In some implementations, the example CDLA process 300 includes receiving an input from the first user during the verbal conversation to translate a subset text data portions from the set of text data portions to a first language. The CDLA server can automatically determine a second language of the verbal conversation and retrieve the set of educational content files relates to translation of the subset text data portions from the second language to the first language.

In some implementations, the example CDLA process 300 can include three phases: data collection, feature removal, and language classification to detect languages spoken during the verbal conversation and facilitate the translations of the languages of the users. For example, the example CDLA process 300 can include using an audio waveform as an input and making no assumptions about the phonetics or the grammars of the captured languages of the spoken conversation. The example CDLA process 300 can determine (or infer, predict) relevant features of the audio waveform from the waveform data, using for example log-Mel spectrum to generate the spectrograms of audio snippets to record the frequency of particular audio utterances and determine the probability of languages recognized by the artificial intelligence algorithms as the output. The length of audio can impact the probability accuracy, for example 20 seconds for 95% accuracy. The artificial intelligence algorithms can be integrated into the CDLA server 200 or, in some implementations, implemented through an external API that can return the detected language.

In some implementations, the CDLA server can detect the languages spoken during the verbal conversation at the beginning of the verbal conversation and continue to monitor the verbal conversation for possible changes based on the languages detected. In some implementations, the information related to the native language of the first user may be stored in the user profiles and preferences (e.g., 211 in FIG. 2). The CDLA server can detect a language of the spoken conversation and determine if the language of the spoken conversation is different from the native language information stored in the user profiles and preferences. If they are different, the CDLA server can translate the verbal (or on-going) conversation into the user's native language using a language conversion tool. The set of educational content and activities can be delivered in both languages consecutively, in the native language only, or in the detected language of the spoken conversation only.

As used herein, the singular forms "a," "an" and "the" include plural referents unless the context clearly dictates otherwise. Thus, for example, the term "an educational content file" is intended to mean a single educational content file or multiple educational content files with similar functionalities. For another example, the term "an ordered playlist" is intended to mean a single ordered playlist or multiple ordered playlists.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be examples and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a compute device including a computer can be embodied in any of a number of forms, such as a rack-mounted computer, a desktop computer, a laptop computer, netbook computer, or a tablet computer. Additionally, a computer can be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

The invention claimed is:

1. A method, comprising:
    receiving, at a processor, audio data related to a verbal conversation between a first user and a second user, the audio data being transmitted from a voice-assisted electronic device in communication with the processor;
    converting, at the processor and using a natural language processing algorithm, the audio data into a plurality of text data portions during the verbal conversation, each text data portion from the plurality of text data portions associated with a timestamp from a plurality of timestamps and at least one of the first user and the second user;
    mapping, during the verbal conversation, each of the plurality of text data portions to one of the first user and the second user;
    analyzing, at the processor, the plurality of text data portions to determine a domain of the verbal conversation and a plurality of concepts associated with the domain;
    retrieving, at the processor, a plurality of educational content files associated with the plurality of concepts to provide educational content related to and during the verbal conversation to the first user or the second user;
    sending, from the processor and based on the plurality of timestamps and a plurality of properties of each educational content file from the plurality of educational content files, at least one pause notification to the voice-assisted electronic device, the at least one pause notification being outputted through an audio output of the voice-assisted electronic device and causing the voice-assisted electronic device to pause the verbal conversation;
    generating, using the processor, a digital marker for each concept of the plurality of concepts, the digital marker indicating a starting point for each educational content files of the plurality of educational content files; and
    automatically sending, during the at least one pause of the verbal conversation, a signal to playback, through the audio output of the voice-assisted electronic device and at the digital marker, at least one educational content file from a playlist of the plurality of educational content files to facilitate education to the first user or the second user related to the domain.

2. The method of claim 1, wherein the receiving the audio data is repeatedly and substantially in real-time as the verbal conversation takes place between the first user and the second user.

3. The method of claim 1, wherein the verbal conversation is pre-recorded.

4. The method of claim 1, wherein the plurality of educational content files includes at least one of a passive content type, an active content type, or a recall content type.

5. The method of claim 1, further comprising:
    sending, from the processor, a notification to resume the verbal conversation when the playback of the at least one educational content file ends.

6. The method of claim 1, further comprising:
    sending, from the processor, a notification to inform the first user or the second user that the playlist of the plurality of educational content files is available.

7. The method of claim 1, wherein:
    the plurality of educational content files is a first plurality of educational content files; and
    the method further includes:
    repeatedly monitoring, at the processor, the verbal conversation;
    continuously converting, at the processor, the verbal conversation into ongoing text data;
    updating, based on the ongoing text data, the domain of the verbal conversation or the plurality of concepts associated with the domain to generate an updated domain or an updated plurality of concepts associated with the updated domain; and
    updating the playlist based on the updated domain or the updated plurality of concepts to automatically play a second plurality of educational content files relevant to the verbal conversation.

8. The method of claim 1, wherein:
    the plurality of educational content files is a first plurality of educational content files; and
    the method further includes:
    receiving, from the first user or the second user during the verbal conversation, an input indicating to change the domain to an updated domain; and
    updating the playlist based on the updated domain to automatically play a second plurality of educational content files relevant to the verbal conversation.

9. The method of claim 1, further comprising:
    determining, at the processor during the verbal conversation and for each concept from the plurality of concepts, a relevancy level of that concept and from a plurality of relevancy levels at least based on the domain and a time period between that concept and a next different concept from the plurality of concepts, each relevancy level from the plurality of relevancy levels indicating a correspondence between that concept and the verbal conversation;
    ranking, at the processor, the plurality of concepts based on the plurality of relevancy levels;
    selecting, at the processor, a subset of concepts from the plurality of concepts based on the ranking; and retrieving, at the processor, the plurality of educational content files associated with the subset of concepts.

10. The method of claim 1, wherein the playlist of the plurality of educational content files is personalized for the first user based on a learning profile of the first user.

11. The method of claim 1, wherein:
the plurality of educational content files relates to translation from a first language of the verbal conversation to a second language different from the first language.

12. The method of claim 1, further comprising:
receiving an input from the first user during the verbal conversation to translate a subset text data portions from the plurality of text data portions to a first language; and
automatically determining a second language of the verbal conversation,
the plurality of educational content files relates to translation of the subset text data portions from the second language to the first language.

13. The method of claim 1, further comprising:
automatically determining, during the verbal conversation, a first native language of the first user based on the verbal conversation; and
automatically determining, during the verbal conversation, a second native language of the second user based on the verbal conversation,
the plurality of educational content files relates to translation of ongoing conversation between the first native language and the second native language.

14. A non-transitory processor-readable medium storing code representing instructions to be executed by a processor, the code comprising code to cause the processor to:
repeatedly monitor, at a processor, a verbal conversation between a first user and a second user;
continuously convert, at the processor and using a natural language processing algorithm, the verbal conversation into ongoing text data including a plurality of text data portions during the verbal conversation, each text data portion from the plurality of text data portions associated with a timestamp from a plurality of timestamps and at least one of the first user or the second user;
map, during the verbal conversation, each of the plurality of text data portions to one of the first user and the second user;
analyze, at the processor, the plurality of text data portions to determine a domain of the verbal conversation and a plurality of concepts associated with the domain;
retrieve, at the processor, a plurality of educational content files associated with the plurality of concepts to provide educational content related to and during the verbal conversation to the first user or the second user;
send, from the processor and based on the plurality of timestamps and a plurality of properties of each educational content file from the plurality of educational content files, at least one pause notification to a voice-assisted electronic device associated with one of the first user and the second user, the at least one notification being outputted through an audio output of the voice-assisted electronic device and causing the voice-assisted electronic device to pause the verbal conversation;
generate, using the processor, a digital marker for each concept of the plurality of concepts, the digital marker indicating a starting point for each educational content files of the plurality of educational content files; and
automatically send, during the at least one pause of the verbal conversation, a signal to playback, through the audio output of the voice-assisted electronic device and at the digital marker, at least one educational content file from a playlist of the plurality of educational content files to facilitate translation of languages.

15. The non-transitory processor-readable medium of claim 14, wherein the code further comprises code to cause the processor to:
receive an input from the first user to translate a subset text data portions from the plurality of text data portions to a first language; and
automatically determine a second language of the verbal conversation,
the plurality of educational content files relates to translation of the subset text data portions from the second language to the first language.

16. The non-transitory processor-readable medium of claim 14, wherein the code further comprises code to cause the processor to:
automatically determine a first native language of the first user based on the verbal conversation; and
automatically determine a second native language of the second user based on the verbal conversation,
the plurality of educational content files relates to translation of ongoing conversation between the first native language and the second native language.

17. The non-transitory processor-readable medium of claim 14, wherein the plurality of educational content files includes at least one of a passive content type, an active content type, or a recall content type.

18. The non-transitory processor-readable medium of claim 14, wherein the code further comprises code to cause the processor to:
send, from the processor and when the playback of the at least one educational content file ends, a notification to resume the verbal conversation.

19. The non-transitory processor-readable medium of claim 14, wherein the playlist of the plurality of educational content files is personalized for the first user or the second user based on a learning profile for the first user or the second user.

20. The non-transitory processor-readable medium of claim 14, wherein the code further comprises code to cause the processor to:
update, based on the ongoing text data, the domain of the verbal conversation or the plurality of concepts associated with the domain to generate an updated domain; and
update the playlist based on the updated domain to automatically play a second plurality of educational content files relevant to the verbal conversation.

21. The non-transitory processor-readable medium of claim 14, wherein:
the plurality of educational content files is a first plurality of educational content files; and
the code further comprises code to cause the processor to:
receive an input from the first user or the second user indicating to update the domain to a different domain or the plurality of concepts to a different plurality of concepts; and
update the playlist based on the updated domain or the different plurality of concepts to automatically play a second plurality of educational content files relevant to the verbal conversation.

22. The non-transitory processor-readable medium of claim 14, wherein:
the code further comprises code to cause the processor to automatically determine a language of the verbal conversation; and
the at least one educational content file is played in the language.

23. The non-transitory processor-readable medium of claim 14, wherein the code further comprises code to cause the processor to:
automatically determine a first language of the verbal conversation; and
translate the at least one educational content file from a second language to the first language.

24. A method, comprising:
repeatedly monitoring, at a processor via a voice recording device, a verbal conversation between a first user and a second user;
continuously converting, at the processor and using a natural language processing algorithm, the verbal conversation into ongoing text data including a plurality of text data portions during the verbal conversation, each text data portion from the plurality of text data portions associated with a timestamp from a first plurality of timestamps and at least one of the first user or the second user;
mapping, during the verbal conversation, each of the plurality of text data portions to one of the first user and the second user;
analyzing, at the processor, the plurality of text data portions to determine a first domain of the verbal conversation and a first plurality of concepts associated with the first domain;
determining, at the processor and for each concept from the first plurality of concepts, a relevancy level of that concept and from a plurality of relevancy levels at least based on the first domain and a time period between that concept and a next different concept from the first plurality of concepts, each relevancy level from the plurality of relevancy levels indicating a correspondence between that concept and the verbal conversation;
ranking, at the processor, the first plurality of concepts based on the plurality of relevancy levels;
selecting, at the processor, a subset of concepts from the first plurality of concepts based on the ranking;
retrieving, at the processor, a first plurality of educational content files associated with the subset of concepts to provide educational content related to and during the verbal conversation to the first user or the second user, the first plurality of educational content files including at least one of a passive content type, an active content type, or a recall content type;
determining, at the processor and based on a plurality of properties of each educational content file from the first plurality of educational content files, a second plurality of timestamps to send a pause notification at the second plurality of timestamps, the pause notification being outputted through an audio output of the recording device and causing the voice recording device to pause the verbal conversation;
generating, using the processor, a digital marker for each concept of the plurality of concepts, the digital marker indicating a starting point for each educational content files of the plurality of educational content files; and
automatically sending, during the pause of the verbal conversation, a signal to playback through the audio output of the voice recording device, at the digital marker, at least one educational content file from a playlist of the first plurality of educational content files at the second plurality of timestamps;
analyzing, based on the ongoing text data, to determine (1) a second domain of the verbal conversation at a second time different from the first domain of the verbal conversation at a first time or (2) a second plurality of concepts at the second time different from the first plurality of concepts at the first time;
receiving an input from the first user or the second user indicating to change the second domain to a third domain different from the second domain or a third plurality of concepts different from the second plurality of concepts; and
updating the playlist based on (1) the analyzing based on the ongoing text data or (2) the input, to automatically play a second plurality of educational content files relevant to the verbal conversation.

* * * * *